Aug. 25, 1936. S. E. HILBLOM 2,052,294
ADJUSTING AND DRIVING MECHANISM FOR TRACTOR MOWERS
Filed Aug. 24, 1935 3 Sheets-Sheet 1
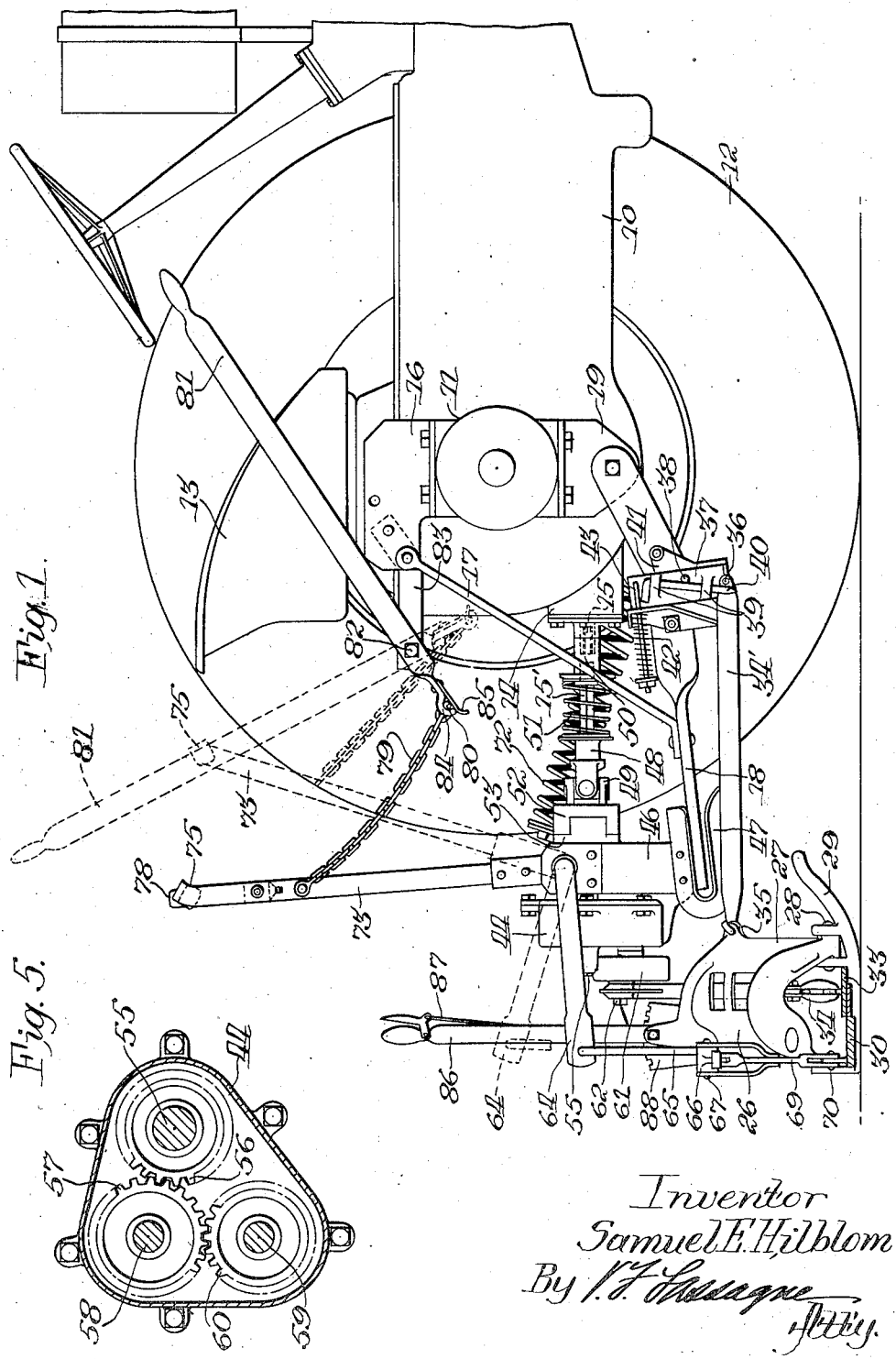
Inventor
Samuel E. Hilblom

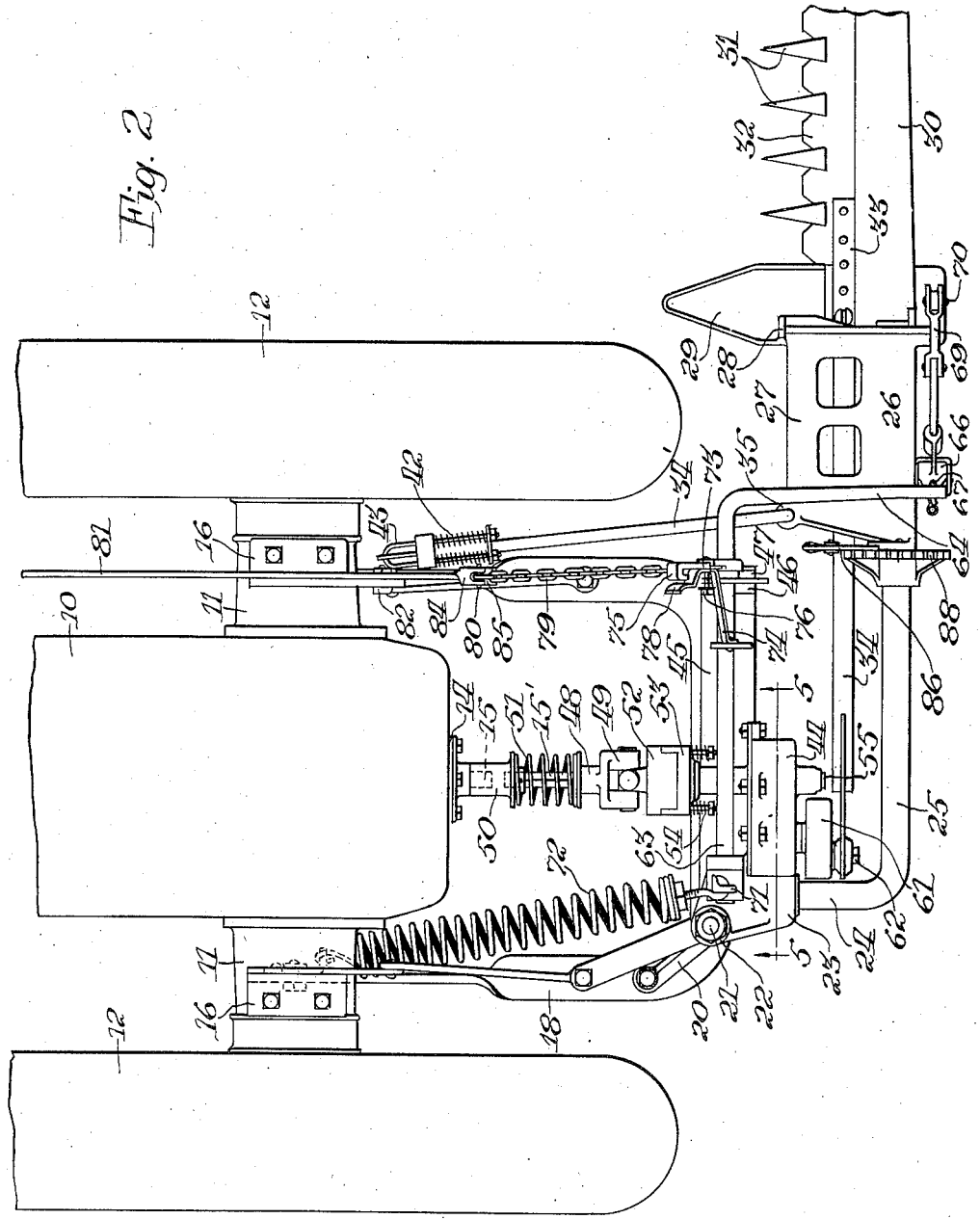

Aug. 25, 1936. S. E. HILBLOM 2,052,294
ADJUSTING AND DRIVING MECHANISM FOR TRACTOR MOWERS
Filed Aug. 24, 1935 3 Sheets-Sheet 3
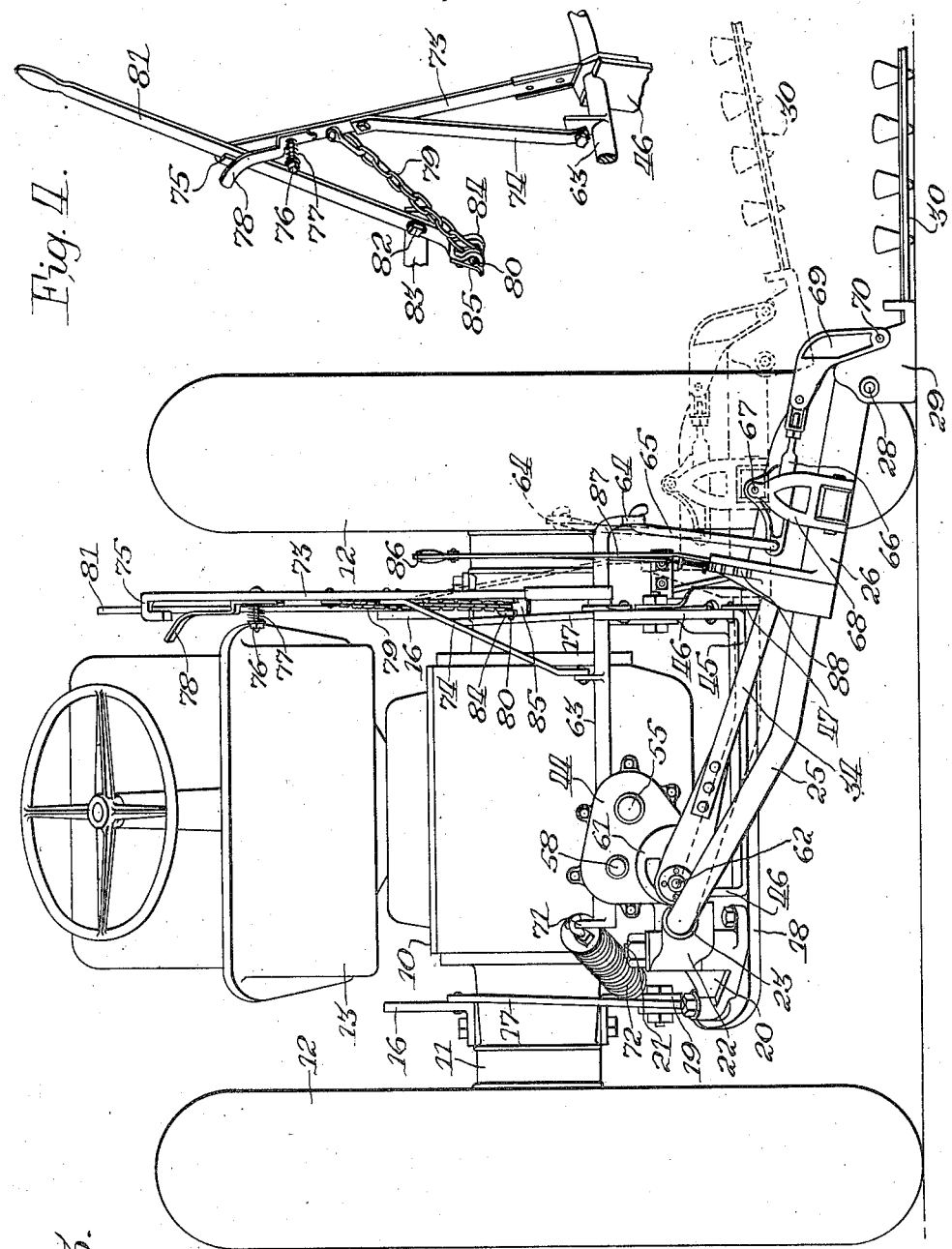
Inventor
Samuel E. Hilblom Patented Aug. 25, 1936

2,052,294

UNITED STATES PATENT OFFICE 2,052,294

ADJUSTING AND DRIVING MECHANISM
FOR TRACTOR MOWERS

Samuel E. Hilblom, Chicago, Ill., assignor to International Harvester Company, a corporation of New Jersey Application August 24, 1935, Serial No. 37,664

17 Claims. (Cl. 56—25)

The invention relates to improvements in rear connected tractor mowers. More specifically the invention pertains to an improved lever mechanism for raising the cutter bar off the ground, and to gearing for driving the mower from the power take-off shaft of the tractor.

It is customary to connect tractor mowers of this type to the tractor or to a support, such as a draw-bar carried by the tractor, in such a manner that the cutter bar may be released when it encounters an obstruction in the field to swing back horizontally from a position laterally of the tractor to a position to the rear thereof to save the mower bar from injury. This is accomplished by pivotally mounting the mower structure at one point to the tractor or the support and releasably connecting the structure to the tractor or support at another point, the latter connection comprising an overload release connection.

The cutter bar must, of course, be mounted for hinging movement in a vertical plane to raise the same off the ground during normal operation of the mower when slight obstructions are to be passed. Such vertical adjustment of the cutter bar is accomplished by a hand operated lever and it has been customary in the past to provide a long lever to make it possible for an operator on his seat on the tractor to make this adjustment of the cutter bar, the lever being long necessarily to provide the requisite leverage. When a long lever is hand-operated it must swing through such a long arc that it is awkward for the operator on the tractor to manipulate the same. Further in orchard work the lever stands so high that it objectionably catches on low hanging branches and limbs.

It is desirable, therefore, to provide a manually operable lever of shorter length which will still provide the necessary power and leverage for adjusting the cutter bar vertically and it is to the provision of such means that the present invention particularly relates.

As the tractor mower is obstruction released and swings rearwardly in a horizontal plane the lever cannot very satisfactorily be mounted on the mower structure and accordingly it has been the practice to mount the lever on the tractor and to have the lever operate some auxiliary lever carried on the mower structure for raising the cutter bar. This involved a problem in the utilization of lever locks such as the usual detent and quadrant mechanism. By the present invention a novel form of lever lock is operatively associated with the main lift lever on the tractor and the auxiliary interconnected lift lever on the mower structure.

The main object of the invention is generally to improve the construction and to enhance the operation of tractor mowers of the type specified.

A more specific object is to provide an improved form of lever mechanism for vertically adjusting the cutter bar.

Another object is to provide a novel form of lock for an interconnected system of levers used in so adjusting the cutter bar.

Other objects will become known to those versed in this art as the disclosure is more fully made.

In the accompanying set of drawings illustrating the invention:

Figure 1 is a general side elevational view of the rear end of a tractor and a tractor mower connected therewith in operative relationship;

Figure 2 is a plan view of the same construction shown in Figure 1;

Figure 3 is a rear elevational view of the tractor and mower;

Figure 4 is a detailed perspective view of the interconnected system of levers and lock used in raising the cutter bar; and, Figure 5 is a detailed cross sectional view through a gear box taken along the line 5—5 of Figure 2 looking in the direction of the arrows.

The tractor with which the improved mower attachment is operatively associated comprises a body 10, the rear end only of which is shown, said body being carried on a transverse rear axle housing 11, including a pair of traction wheels 12 herein shown on pneumatic tires. The rear end of the body carries an operator's seat 13. The rear lower end of the body 10 carries a housing 14 from which protrudes a rearwardly and longitudinally extending power take-off shaft 15 from which power is to be taken to drive the mower presently to be described.

On each side of the body 10 the axle housing carries on its top side an upstanding bracket 16, each in turn carrying a depending hanger 17 for supporting a U-shaped support 18, the bight thereof, extending rearwardly from below the housing 11, with its legs having their front ends bolted respectively to depending brackets 19 carried from the housing 11 below the brackets 16 heretofore described. This support 18 may be the usual tractor draw-bar if desired. The mower attachment will now be described.

Looking to Figures 2 and 3 it will be seen that the stubbleward end of the support 18 rigidly carries a bracket 20 including a vertical bore in which is mounted a vertical bolt 21 on which is turnably mounted a collar 22 having a longitudinal rearward socket 23 for rockably journaling the rearwardly and longitudinally disposed bent end 24 of a transverse coupling bar or arm 25 which extends transversely and downwardly at the rear end of said support 18.

The grassward end of said arm 25 terminates substantially to the rear of the grassward traction wheel 12 where it rockably carries a long sleeve bearing 26 included in a yoke bracket 27. Said yoke 27 carries the usual horizontal longitudinal hinge pins 28 for hingedly connecting the mower shoe 29 to the yoke. This shoe has connected thereto and carries in the usual way a transversely extending cutter bar 30 on which is supported the standard guards 31, knife 32, and knife head 33. A pitman 34 is operatively connected to this knife head 33 to reciprocate the knife 32 through the guards 31, said pitman passing transversely under the yoke 27 in a stubbleward direction. The drive for the pitman will be presently described.

A draw link 34' is substantially longitudinally disposed and has its rear hooked end pivotally connected, in an eye 35 formed at the front side of the yoke 27 as shown. The front end of the said rod has an overload release connection with some suitable point on the tractor such as shown in Figure 1 on the draw-bar or support 18. This release connection is only generally shown herein it being understood that this connection is substantially identical with that shown in Pearson Patent No. 1,911,388 issued May 30, 1933. Generally the front end of the rod 34' carries a transverse fixed pin 36 adapted to fit a notch formed in the lower end of a lever 37 pivoted at 38. This lever carries apertured bosses 39 for removably retaining a latch pin 40 that extends down along the outer side of the rod 34' to prevent the pin 36 from pulling laterally out of its notch in the lever 37. The pivot 38 is carried on a bracket 41 secured to the adjacent leg of the U-support 18. The bracket 41 is so constructed that normally it will not permit the pin 36 to drop downwardly out of its notch in the lever 37. The bracket 41 includes a part that carries compression springs 42 on a hair pin bolt 43 in turn connected to the upper end of the lever 37. The springs are fixed in the desired compression and exert a pull to hold the lower end of the lever 37 in the normal forward position shown in Figure 1.

It can now be seen that the pull rod or link 34 holds the mower bar 30 in its normal cutting position. However when the bar encounters an obstruction with sufficient force the pull exerted on the rod 34' causes the pin 36 to pull the lower end of the lever 37 rearwardly against the force exerted by the springs 42. As the lower end of the lever 37 moves back it reaches such an angle as to permit the pin 36 to drop downwardly out of its notch in the lower end of the lever 37 whereupon the pull rod or link 34' is freed at its front end. Thus no parts are effective to hold the cutter bar in its transverse cutting position and consequently as the tractor moves ahead the cutter bar 30, with the coupling arm 25 and bracket 22 swing about the vertical pivot pin 21 in a horizontal plane, through an arc of substantially 90 degrees, to save the cutter bar from injury all as has been described in greater detail in the prior Pearson patent mentioned above.

Attached rigidly to the pivot bracket 22 is a gear box 44 which is also securely mounted on a transverse plate 45 which rests loosely on the rear end of the support 18, opposite ends of said plate being bent upwardly as at 46. The grassward end of said plate 45 further carries a horizontal U-shaped guide piece 47 to embrace the bar 18 for stabilizing the mounting of the mower structure on the said bar or support 18.

A sleeve 48 formed as part of a universal knuckle 49 is provided, said knuckle sleeve including a shaft extension 15' fitted at its front end in a collar 50 having a socket to fit over the projected rear end of the tractor power take-off shaft 15, said shaft 15 and complementary socket being splined.

A spring 51 encircles the power take-off shaft extension 15' and serves yieldingly to press the collar 50 on to the shaft 15. The knuckle 49 includes a slip clutch part 52 and a complementary part 53, said parts being drivingly held together by springs 54 to drive a shaft 55 (see Figure 5), arranged longitudinally and journaled at one side of the gear box 44. Within the box said shaft 55 carries a drive gear 56 which meshes with and drives a gear 57 on a parallel countershaft 58 also journaled in the box 44 near the top thereof and to one side of the shaft 55. Also within the box 44 below the shaft 58 is a third parallel shaft 59 carrying a gear 60 driven from the gear 57 to turn said shaft 59.

The rear end of the shaft 59 extends out of the case 44 to carry and drive a fly wheel 61 in turn carrying an eccentric wrist pin 62 to which is operatively connected the pitman 34 heretofore described.

As shown best in Figures 2 and 3 the upstanding ends 46 of the plate 45 are provided with means at their upper ends for rockably journaling a transverse rock shaft 63 having its grassward end provided with a rather long rearwardly extended crank portion 64 which carries a link 65, said link 65 being pivotally connected at its lower end to a lever 66. Said lever 66 is pivoted intermediate its ends at 67 to a fulcrum bracket 68 carried on the yoke sleeve 26. The lever 66 has pivotal connection with a lift link 69 pivoted at 70 to the shoe 29.

The opposite end of the shaft 63 carries a relatively short crank 71 to which is connected a counterbalancing spring 72 having its other end appropriately connected to some fixed point on the tractor such for example as to the adjacent leg of the support 18.

Fixed at its lower end to said shaft 62 and adjacent the grassward end thereof is an upstanding lever and lock arm 73 suitably braced by a brace 74 to another point on the shaft, as shown. As best shown in Figure 4 the upper end of the lever 73 is bent back on itself as at 75 to provide a locking or retaining lip as will later appear. Below this lip 75 the lever carries a bolt 76 encircled by a compression spring 77 for yieldingly clamping a latch arm 78 mounted on the bolt, against the lip 75. The arm 78 is curved as shown to guide another lever presently to be described into locking engagement with the lever 73. Further, the lever 73 has anchored to it below the bolt 76 one end of a flexible element, such as a chain 79. The opposite end of this chain carries a cross bolt 80.

This other lever which was just mentioned is shown at 81 the same being fulcrumed on a pivot pin 82 carried on a suitable bracket 83 mounted on the tractor and particularly on the bracket 16 at the grassward end of the rear axle housing 11. This lever 81 is conveniently positioned adjacent the seat 13 where the operator can easily operate the same, said lever being relatively short, compared with lift levers heretofore used on these mowers, so as not to catch on branches when the outfit is moving under trees in an orchard, having low hanging branches and foliage. The lever 81 extends a slight distance below its fulcrum as shown in Figure 1, where it will be seen that the said lower end carries a hook shaped part 84 to receive the chain bolt 80 for releasably connecting the chain to the lever 81. Said chain is releasably held connected to the lever 81 by means of a flat spring clip 85 as shown.

The cutter bar can be tilted in any usual way as for example by means of a tilt lever 86 made fast to the yoke 27 said lever having a detent lock 87 cooperable with a toothed quadrant 88 carried fast on the coupling arm 25. When the detent 87 is unlocked the lever 86 may be manually moved to rock the yoke 27 which carries the cutter bar 30 with it, through the shoe 29, to tilt the cutter bar and guards thereon. The detent lock enables the bar to be set in the desired adjusted tilt position.

In operation the normal position of the mower with respect to the tractor is shown in Figures 1 and 2 and in Figure 3 in the full lines. As shown the lever 81 is in a down forward position; the lever lock arm stands substantially upright; the chain 79 is slack; and the cutter bar 30 is in cutting position on the ground. The vertical pivot 21 for the mower attachment is inoperative because of the release connection 36, 37, which is held by the springs 42 to make the rod link 34 effective as a draw connection for keeping the mower bar 30 in the transverse normal position. Should an obstruction be encountered by the bar 30 with sufficient force the bar 30, with the coupling arm 25, and all parts connected with the bracket 22, such as the box 44, plate 45 and parts carried thereby, swing back in a horizontal plane through an arc of about 90 degrees about the vertical pivot 21 to save the cutter bar from injury. As this structure swings back the drive to the cutting mechanism automatically stops as the collar 50 pulls off the power take-off spline shaft 15. Further the front end 80 of the chain 79 pulls out from the hook 84 and latch spring 85 to separate the chain from the lever 81.

After the tractor in moving ahead has dragged the released mower structure past the obstruction the tractor will be stopped. By backing the tractor the mower is brought back to its relative cutting position where it is possible for the attendant quickly to recouple, by hand, the chain 79 to the lever 81; the sleeve 50 to the power take-off shaft 15; and the release connection of the link 34 to the lever 37.

During the cutting operation occasion may arise to make it necessary for the operator to raise the cutter bar to an intermediate or plain lift position, as shown in the dotted lines in Figure 3, to avoid a minor obstruction in the path of the cutter bar. This is accomplished by the operator from his seat on the tractor by grasping the lever 81 and moving it from the full line position to the dotted line position thereof as appears in Figure 1. The lower end of the lever 81 thus swings forwardly to take slack out of the chain 79. Eventually the taut chain picks up the auxiliary lever 73 and swings it forwardly, thus rocking the shaft 63 to raise the crank arm 64 as indicated in the dotted lines in Figure 1. The crank 64 raises the link 65 to operate the lever 66 to pull the lift link 69. This action raises the shoe 29 off the ground and with it the yoke 28 and the coupling arm 25 which at its bent end 24 rocks pivotally in the sleeve 23 of bracket 22. The spring 72 exerts a pull to counterbalance the weight of these parts to minimize the physical effort required of the operator in moving the lever 81. As the shoe 29 rises off the ground the cutter bar 30 moves with it. During the lifting movement the lift link 69 causes the shoe 29 with the bar 30 to hinge about the horizontal pivots 28 to raise the bar 30 to the angled, or plain lift position thereof shown by the dotted lines in Figure 3.

Looking to Figures 1 and 4 it will be seen that when the cutter bar reaches its maximum raised position the hand lever 81 has swung backwardly and the auxiliary lever arm 73 has swung forwardly to a point where the lengthwise axes of the two levers intersect. At this point the lever 81 hits the guide piece 78 on the arm 73 which yields against the spring 76 to permit the lever 81 as shown in Figure 4 to snap behind the curled lip 75 to lock the two levers together. Thus, the cutter bar through the lever lock described remains in raised latched position. A slight hand pressure on the lever 81 in a down and rearward direction makes it possible quickly to release the lever 81 from the lock lever arm 73 to permit the cutter bar to drop by gravity back to ground contact and cutting position.

This simplified lever lift mechanism thus eliminates the use of a long single lift lever with its detent lock and quadrant. The lever 81 is thus relatively short but due to its fulcruming builds up angle power to actuate the auxiliary lever 73 which performs the lift operation. The lever 81 obviously has a range of movement very convenient for the operator on the seat 13 to handle.

From this disclosure it is now clear that an improved mower structure, including the simplified cutter bar lift mechanism, has been provided, which achieves all of the desirable objects heretofore recited for the invention.

It is the intention to cover all changes and modifications of the practicable example of the invention chosen herein for purposes of illustration, which do not in material respects constitute departures from the spirit and scope of the invention as hereinafter claimed.

What is claimed is:

1. The combination with a tractor including a support carried at the rear end thereof, of a mower attachment connected to the support including a transverse coupling arm having its stubbleward end mounted for pivotal movement about a substantially horizontal longitudinal axis, said coupling arm carrying a yoke, a cutter bar pivotally connected to the yoke for hinging movement in a vertical plane, a rockably mounted arm included in the mower attachment having connections for raising the shoe and swinging the coupling arm and cutter bar about their respective pivots, a lever fulcrumed on the tractor intermediate its ends for swinging movement in a vertical plane, and a connection between the lever and arm whereby movement of the former operates the latter to raise the cutter bar, yoke, and coupling arm.

2. The combination with a tractor including a support carried at the rear end thereof, of a mower attachment connected to the support including a transverse coupling arm having its stubbleward end mounted for pivotal movement about a substantially horizontal longitudinal axis, said coupling arm carrying a yoke, a cutter bar pivotally connected to the yoke for hinging movement in a vertical plane, a rockably mounted arm included in the mower attachment having connections for raising the shoe and swinging the coupling arm and cutter bar about their respective pivots, a lever fulcrumed on the tractor intermediate its ends for swinging movement in a vertical plane, and a flexible connection between the lower end of the lever and arm whereby movement of the former operates the latter to raise the cutter bar, yoke, and coupling arm.

3. The combination with a tractor including a support carried at the rear end thereof, of a mower attachment connected to the support including a transverse coupling arm having its stubbleward end mounted for pivotal movement about a substantially horizontal longitudinal axis, said coupling arm carrying a yoke, a cutter bar pivotally connected to the yoke for hinging movement in a vertical plane, a rockably mounted arm included in the mower attachment having connections for raising the shoe and swinging the coupling arm and cutter bar about their respective pivots, a lever lock means carried on said arm, a lever fulcrumed on the tractor intermediate its ends for swinging movement in a vertical plane, a connection between the lever and arm whereby movement of the former operates the latter to raise the cutter bar, yoke, and coupling arm, said lever and arm in operation moving toward each other until their axes intersect whereupon the lever engages the lock means on the arm to lock the lever and arm.

4. The combination with a tractor including a support carried at the rear end thereof, of a mower attachment connected to the support including a transverse coupling arm having its stubbleward end mounted for pivotal movement about a substantially horizontal longitudinal axis, said coupling arm carrying a yoke, a cutter bar pivotally connected to the yoke for hinging movement in a vertical plane, a rockably mounted arm included in the mower attachment having connections for raising the shoe and swinging the coupling arm and cutter bar about their respective pivots, a latch device mounted on the upper end of the arm, a lever fulcrumed on the tractor intermediate its ends for swinging movement in a vertical plane, a flexible connection between the lever and arm whereby movement of the former operates the latter to raise the cutter bar, yoke, and coupling arm, said lever and arm in operation moving toward each other until their axes intersect whereupon the lever engages the latch to be held and locked in position thereby.

5. The combination with a tractor including a support carried at the rear end thereof, of a mower attachment connected to the support including a transverse coupling arm having its stubbleward end mounted for pivotal movement about a substantially horizontal longitudinal axis, said coupling arm carrying a yoke, a cutter bar pivotally connected to the yoke for hinging movement in a vertical plane, a rockably mounted arm included in the mower attachment having connections for raising the shoe and swinging the coupling arm and cutter bar about their respective pivots, a lever fulcrumed on the tractor for swinging movement in a vertical plane, a connection between the lever and arm whereby movement of the former operates the latter to raise the cutter bar, yoke, and coupling arm, said arm and lever approaching each other in use until their axes substantially intersect, and a latch means adapted to locate at said point of intersection for releasably locking the arm and lever together.

6. The combination with a tractor including a support carried at the rear end thereof, of a mower attachment connected to the support including a transverse coupling arm having its stubbleward end mounted for pivotal movement about a substantially horizontal longitudinal axis, said coupling arm carrying a yoke, a cutter bar pivotally connected to the yoke for hinging movement in a vertical plane, a rockably mounted arm included in the mower attachment having connections for raising the shoe and swinging the coupling arm and cutter bar about their respective pivots, a lever fulcrumed on the tractor for movement in a vertical plane, a connection between the lever and arm whereby movement of the former operates the latter to raise the cutter bar, yoke, and coupling arm, a lock device carried on the arm, said arm and lever in operation approaching each other until their axes substantially intersect, whereupon the lock device receives the lever to lock it against further movement.

7. The combination with a tractor including a support carried at the rear end thereof, of a mower attachment connected to the support including a transverse coupling arm having its stubbleward end mounted for pivotal movement about a substantially horizontal longitudinal axis, said coupling arm carrying a yoke, a cutter bar pivotally connected to the yoke for hinging movement in a vertical plane, a rockably mounted arm included in the mower attachment having connections for raising the shoe and swinging the coupling arm and cutter bar about their respective pivots, a lever fulcrumed on the tractor for swinging movement in a vertical plane, a connection between the lever and arm whereby movement of the former operates the latter to raise the cutter bar, yoke, and coupling arm, the upper end of the arm being bent to provide a lip, said arm carrying a spring pressed guide piece, said arm and lever in operation approaching each other until the lever strikes the guide piece to be moved behind the lip to lock the lever to the arm.

8. The combination with a tractor including a support carried at the rear end thereof, of a mower attachment connected to the support including a transversely disposed coupling arm, a yoke carried by the coupling arm, a transversely disposed cutter bar pivotally connected to the yoke, a rock shaft included in the mower structure, said shaft carrying an upright arm rockable with the shaft, said shaft embodying connections for raising the coupling arm and yoke, and to raise the cutter bar off the ground, a lever fulcrumed intermediate its ends on the tractor, a connection between the lever and arm whereby movement of the lever causes movement of the arm to raise the said coupling arm, yoke, and cutter bar, said upright arm and lever in operation being movable toward each other until their axes substantially intersect, and a lock device for releasably locking the lever to retain the raised parts in raised position.

9. The combination with a tractor including a support carried at the rear end thereof, of a mower attachment connected to the support including a transversely disposed coupling arm, a yoke carried by the coupling arm, a transversely disposed cutter bar pivotally connected to the yoke, a rock shaft included in the mower structure, said shaft carrying an upright arm rockable with the shaft, said shaft having one end formed as a crank, means connected to the crank for raising the coupling arm and yoke, and to raise the cutter bar off the ground, a lever fulcrumed intermediate its ends on the tractor, a connection between the lever and arm whereby movement of the lever causes movement of the arm to raise the said coupling arm, yoke, and cutter bar, said upright arm and lever in operation being movable toward each other until their axes substantially intersect, and a lock device mounted on the upright arm to receive and releasably lock the lever to retain the raised parts in raised position.

10. The combination with a tractor including a support carried at the rear end thereof, of a mower attachment connected to the support including a transversely disposed coupling arm, a yoke carried by the coupling arm, a transversely disposed cutter bar pivotally connected to the yoke, a rock shaft included in the mower structure, said shaft carrying an upright arm rockable with the shaft, said shaft embodying connections for raising the coupling arm and yoke, and to raise the cutter bar off the ground, a lever fulcrumed intermediate its ends on the tractor, a flexible connection between the lever and arm whereby movement of the lever causes movement of the arm to raise the said coupling arm, yoke, and cutter bar, said upright arm and lever in operation being movable toward each other until their axes substantially intersect, and a lock device mounted on the upright arm to receive and releasably lock the lever to retain the raised parts in raised position.

11. The combination with a tractor including a support carried at the rear end thereof, of a mower attachment connected to the support including a transversely disposed coupling arm, a yoke carried by the coupling arm, a transversely disposed cutter bar pivotally connected to the yoke, a rock shaft included in the mower structure, said shaft embodying a crank arm rockable with the shaft, said crank arm embodying connections for raising the coupling arm and yoke, and to raise the cutter bar off the ground, a first lever mounted on the shaft to rock the same, a second lever fulcrumed on the tractor, a connection between the two levers whereby movement of the second lever causes movement of the first lever to raise the said coupling arm, yoke, and cutter bar, said levers in operation being movable toward each other until their axes substantially intersect, and a lock device carried on one of the levers to receive and releasably lock the other lever to retain the raised parts in raised position.

12. The combination with a tractor including a support carried at the rear end thereof, of a mower attachment connected to the support including a transversely disposed coupling arm, a yoke carried by the coupling arm, a transversely disposed cutter bar pivotally connected to the yoke, a first lever included in the mower structure embodying connections for raising the coupling arm and yoke, and to raise the cutter bar off the ground, a second lever fulcrumed on the tractor, a connection between the two levers whereby movement of one causes movement of the other to raise the said coupling arm, yoke, and cutter bar, said levers in operation being movable toward each other until their axes substantially intersect, and a lock device mounted on one of the levers to receive and releasably lock the other lever to retain the raised parts in raised position.

13. The combination with a tractor including a rear support, of a rear connected mower attachable to the support comprising an arm pivoted to the support for movement from a transverse position horizontally to a substantially longitudinal position behind the tractor, a cutter bar movable with said arm and additionally connected thereto for upward swinging movement to raise the same off the ground, a first lever included in the mower structure including connections to raise the cutter bar, a second lever fulcrumed on the tractor intermediate the ends thereof, a connection between the two levers whereby when an operator on the tractor moves the second lever the first lever moves to operate the connections for raising the cutter bar, said connection between the levers being releasable when the arm and cutter bar move back from the normal transverse position horizontally.

14. The combination with a tractor including a rear support, of a rear connected mower attachable to the support comprising an arm pivoted to the support for movement from a transverse position horizontally to a substantially longitudinal position behind the tractor, a cutter bar movable with said arm and additionally connected thereto for upward swinging movement to raise the same off the ground, a first lever included in the mower structure including connections to raise the cutter bar, a second lever fulcrumed on the tractor intermediate the ends thereof, a flexible connection between the two levers whereby when an operator on the tractor moves the second lever the first lever moves to operate the connections for raising the cutter bar, said connection between the levers comprising an element fixedly connected to one of the levers and releasably connected to the other lever for quick release when the arm and cutter bar move back from the normal transverse position horizontally.

15. The combination with a tractor including a rear support, of a rear connected mower attachable to the support comprising an arm pivoted to the support for movement from a transverse position horizontally to a substantially longitudinal position behind the tractor, a cutter bar movable with said arm and additionally connected thereto for upward swinging movement to raise the same off the ground, a first lever included in the mower structure including connections to raise the cutter bar, a second lever fulcrumed on the tractor intermediate the ends thereof, a chain connected between the two levers whereby when an operator on the tractor moves the second lever the first lever moves to operate the connections for raising the cutter bar, a spring clip device carried at the lower end of the second lever, said chain being connected at one end to the first lever and at its other end to said clip on the second lever, said chain being quickly releasable from the clip to separate the levers when the arm and cutter bar move back from the normal transverse position.

16. The combination with a tractor having a rear power take-off shaft and a rear support, of a mower attachment connected to the support including a transverse cutter bar embodying a knife and pitman to operate the latter, a plate included in the attachment and carried on the support, an upright gear box mounted on the plate, said gear box having journaled therein a first longitudinal shaft operatively connected with the power take-off shaft to be driven thereby, a countershaft journaled in the box to one side of the first shaft and parallel therewith, a third power output shaft journaled in the box below the countershaft, said power output shaft being parallel with the other shafts and carrying a crank wheel outside the box to drive the pitman, and a gear carried by each of the three shafts within said box for operatively connecting the shafts.

17. The combination with a tractor having a rear power take-off shaft and a rear support, of a mower attachment connected to the support including a transverse cutter bar embodying a knife and pitman to operate the latter, a plate included in the attachment and carried on the support, an upright gear box mounted on the plate, said gear box having journaled therein three parallel longitudinal shafts having their axes respectively located at the angles of a triangle, means to drive one of the shafts from the power take-off shaft, means to drive the pitman from another of said shafts, and gears within the box and on the shafts for operatively connecting the shafts.

SAMUEL E. HILBLOM.